United States Patent [19]

Pramstraller

[11] 4,227,804
[45] Oct. 14, 1980

[54] ILLUMINATING APPARATUS WITH A LIGHT CONTROL CHANNEL FOR PHOTOGRAPHIC ENLARGING EQUIPMENT WITH A ROTATABLE PICTURE STAGE IN THE PLANE OF THE NEGATIVE TO BE COPIED

[75] Inventor: Wilhelm Pramstraller, Brixen, Italy

[73] Assignee: Durst AG Fabrik Fototechnischer Apparate, Bozen, Italy

[21] Appl. No.: 23,544

[22] Filed: Mar. 26, 1979

[30] Foreign Application Priority Data

May 26, 1978 [IT] Italy ..................... 4832 A/78

[51] Int. Cl.³ .................. G03B 27/54; G03B 27/62
[52] U.S. Cl. .............................. 355/67; 355/75
[58] Field of Search ................ 355/32, 35, 37, 38, 355/67, 68, 70, 71, 18, 55, 56, 72, 74, 75, 77

[56] References Cited

U.S. PATENT DOCUMENTS

| 606,593 | 6/1898 | Stender | 355/67 |
| 2,236,303 | 3/1941 | Skinner et al. | 355/75 X |
| 2,510,363 | 6/1950 | Anderson | 355/75 |
| 3,273,451 | 9/1966 | Wilson | 355/35 X |
| 4,077,716 | 3/1978 | Gandini | 355/67 |

FOREIGN PATENT DOCUMENTS

| 492230 | 4/1953 | Canada | 355/75 |
| 22469 | 11/1905 | United Kingdom | 355/75 |

Primary Examiner—Donald A. Griffin
Attorney, Agent, or Firm—Cahill, Sutton & Thomas

[57] ABSTRACT

An illuminating system for use in a photographic enlarging apparatus having first and second light control channels is disclosed. The light control channels receive and transmit light from a light source; the light exit end of the first light control channel has a diagonal that is less than the longest side of the cross-section of the light entrance end of the second light control channel. A picture stage for receiving and supporting a negative to be projected is secured to the light exit end of the second light control channel. The second light control channel and the picture stage are mounted for unitary rotational movement about an axis normal to the plane of the negative.

15 Claims, 6 Drawing Figures

ILLUMINATING APPARATUS WITH A LIGHT CONTROL CHANNEL FOR PHOTOGRAPHIC ENLARGING EQUIPMENT WITH A ROTATABLE PICTURE STAGE IN THE PLANE OF THE NEGATIVE TO BE COPIED

The invention pertains to photographic enlarging equipment, and more particularly, to illuminating apparatus with a light control channel for use in photographic enlarging equipment having a rotatable picture stage in the plane of the negative to be copied.

Well known enlarging equipment is distinguished by two different illuminating systems: one group concentrates the light radiated from the light source in a condenser lens system and subsequently directs the light onto the negative to be illuminated. The other group of enlarging equipment does not contain lenses in most cases but rather has an illuminating system where the light from the light source enters a light control channel with reflecting inner walls and is therefore subjected to multiple reflections and is then directed to the picture negative in the form of diffused light.

If the enlarging equipment is to be used with a picture stage which can be rotated in the plane of the negative, both illuminating systems described above are unsatisfactory insofar as the available light intensity is concerned, because only a part of the light cross-section is useable for the illumination of the picture negative (which is generally either square or rectangular). The illuminating system using condenser lenses usually has a circular cross-section for the light beam, which necessitates the cropping and cutting of this cross-section for the intended illuminating purposes. The picture stage which holds the negative to be projected is therefore fitted with a mask suitable for the required picture format. This mask blocks the light of the portion of the light cross-section area which is not useable in the application; to avoid stray light, such masks are usually painted black.

If it is required that the picture negative is evenly illuminated for every rotational position of the picture stage, then it is necessary that the illuminating cross-section of the light control channel in the exit light plane opposite the picture negative be larger than the area of the corresponding picture negative, even for the case of a diffuse illuminating system using a reflective light control channel. Such light control channels are usually made with a rectangular or square cross-section and therefore the side length of the area through which the light exits must be at least equal to the diagonal of the corresponding picture format which one wants to illuminate. This, in turn, means that the light cross-section of the illuminating systems must be reduced by a mask in the picture stage. However, experimentally it was found, particularly with diffuse illuminating systems, that a precise matching of the cross-section of the light exit side of the light control channel to the format which is to be illuminated, results in very large advantages with regard to the reduction of the exposure times for the case of photographic copying applications. For this purpose most of the well known illuminating systems with a diffuse light system are often furnished with several interchangeable light control channels which are matched in their cross-section to the format which is to be illuminated. However, such matched cross-sections have precluded rotation of the picture stage.

It is therefore an object of the present invention to provide an illuminating system for use in photographic enlarging equipment that provides improved lighting efficiency.

Another object of the present invention is to provide an improved photographic enlarging apparatus incorporating an illuminating system and wherein a rotatable picture stage is provided.

Still another object of the present invention is to provide photographic enlarging equipment having interchangeable light control channels combined with rotatable picture stages.

By achieving these objects, this invention allows the adaptation in optimum fashion of the cross-section of the light control channel to the format of the picture negative to be projected, while the rotatability of the picture stage is maintained with all concurrent advantages. An additional resulting advantage is the fact that the illuminating system described by this invention can be simply constructed so that the improvement in available light is achieved without a substantial cost increase of the equipment.

The present invention may more readily be described with reference to the accompanying drawings, in which.

Figure 1:
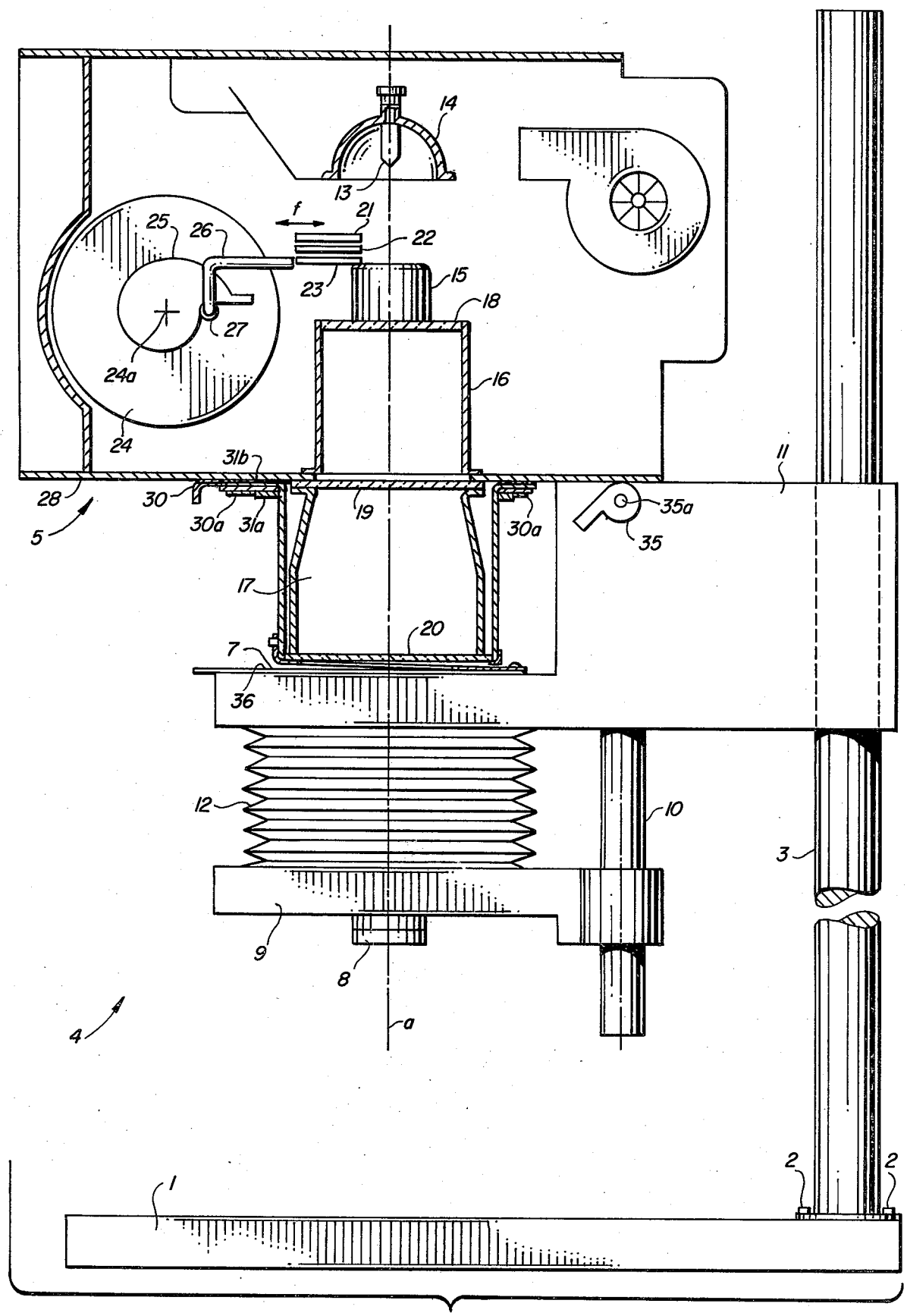
FIG. 1 is a drawing of photographic enlarging equipment with an illuminating system incorporating the teachings of the present invention, partially in section and schematized in the parts which are unnecessary for the understanding of the invention.

Referring now to the drawings, a photographic enlarging apparatus is shown comprising a projection base 1, a vertical column 3 which is connected to the base by a screw fitting 2, and an enlarging head 4 which may be moved along column 3. The enlarging head 4 consists of an illuminating system 5, a picture stage 7 to receive a picture negative 6, (see FIG. 3) and a projection lens 8. This lens is mounted on the objective carrier 9, which is movable along rod 10. Between the holder 11 which receives the illuminating system 5 and the objective carrier 9, a light-proof accordion-like bellows 12 is arranged. The parts mentioned as well as the various control mechanisms for the enlarging head and the objective carrier are generally well known and therefore need not be described in detail.

The illuminating system 5 contains a light source 13, a reflector 14 and three light control channels with reflective inside walls 15, 16, 17 with corresponding diffusing discs 18, 19, and 20 for example. Between the light source 13 and the first light control channel 15 are arranged three color filters 21, 22 and 23 for example, each is one of the three subtractive basic colors yellow, blue-green and purple. These filters may be introduced into the light beam in continuous fashion in the direction of the arrows f, by a suitable control mechanism control such as the cam 25 and follower 27 which actuate the arm 26 to thereby move filter 23. The cam 25 is rotated about axis 24a by rotating the control wheel 24 in a well known manner. Similar control mechanisms may be used for the insertion of filters 21 and 22.

Figure 2:
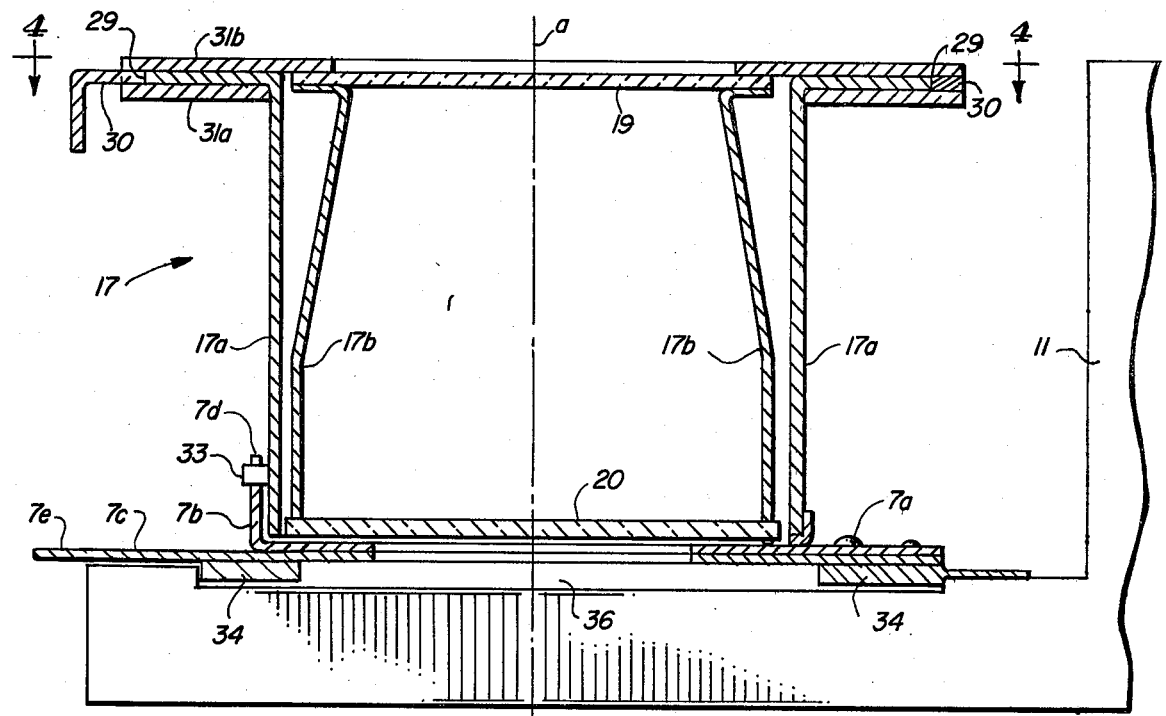
FIG. 2 is an enlarged detail of FIG. 1 with a view of the light control channel and the rotatable picture stage.
Figure 2A:
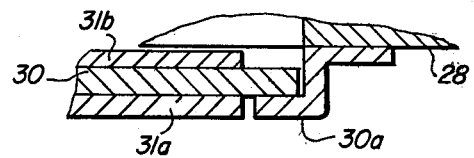
FIG. 2a is an enlarged portion of FIG. 2 showing the relationship of a support and a supported plate.

Below the light control channel 16, a plate 30 may be pushed along a slotted support, adapted to slidably receive the plate 30, into the position shown in FIG. 1; the plate 30 is thereby slidably and detachably connected to the housing 28 of the illuminating system 5. Any convenient means for detachably securing plate 30 to housing 28 may be used. This plate 30 has a circular opening 29 to receive the light control channel 17, which is constructed with a double wall for greater stability. This light control channel is attached in a way so that it may be rotated. For this purpose, the outer walls 17a (see FIG. 2) of the light control channel 17 are attached to two plates 31a and 31b which contact the plate 30 on its upper and lower side along the edges of the opening 29. Plates 31a and 31b also contain an opening for the passage of light. In this arrangement, the distance "d" between plates 31a and 31b is somewhat larger than the thickness of the plate 30, to allow a satisfactory rotary motion of the light control channel 17. The opening 29 and the part of the light control channel 17 which extends into the opening 29, are matched in their individual dimensions in such a way that the rotating axis exhibits only a little play when the light control channel is rotated; the inner walls 17b are made reflective on the inside and are attached in known fashion to the outer walls 17a. On the outer wall 17a of the light control channel 17, a protrusion 33 is attached.

Figure 4:
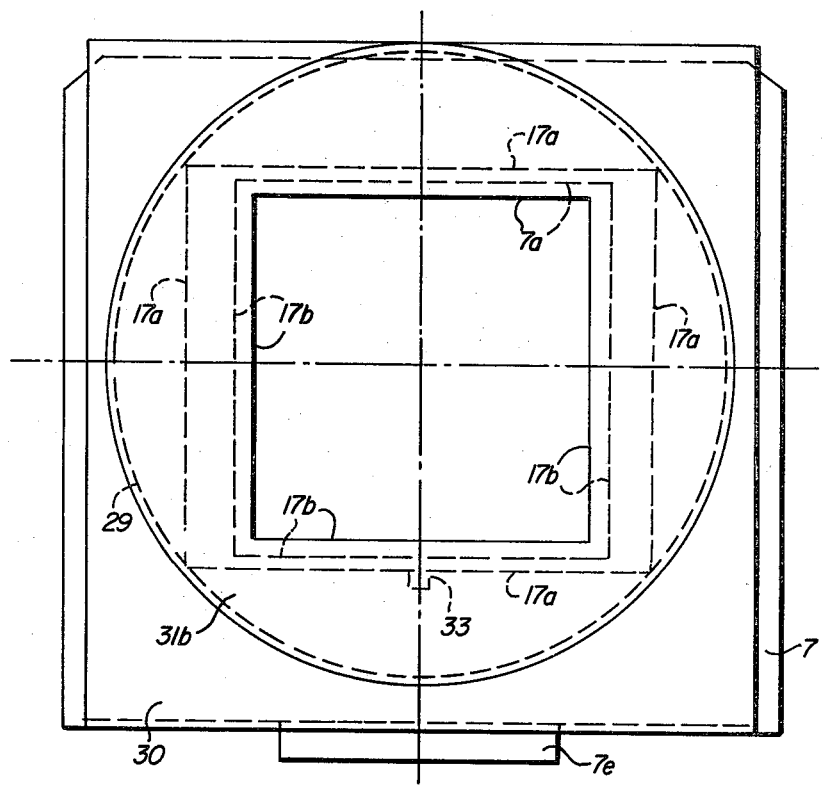
FIG. 4 is a section, taken along the line 4—4, of FIG. 2, somewhat simplified, to facilitate the description of the invention.
Figure 5:
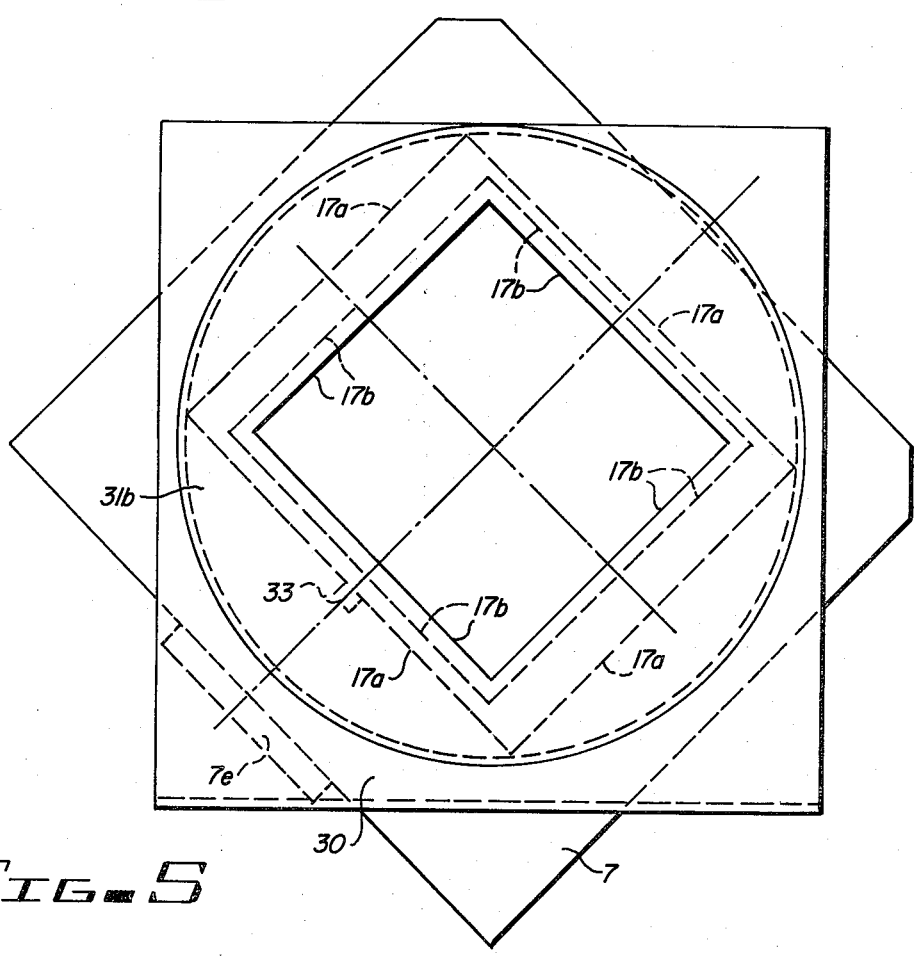
FIG. 5 is the same view as FIG. 4 with the light control channel and the picture stage rotated 45° relative to the position shown in FIG. 4.

The picture stage 7 consists of two parts 7b and 7c which are held together, for example, by a hinge 7a. The upper part 7b is bent up in the shape of an "L" on the forward side of the enlarging apparatus. In this bent up portion, a hole 7d is provided which engages the protrusion 33 to permit the light control channel 17 and the picture stage 7 to be rotated in unison. The lower part 7c of the picture stage has raised portions 34 which fit into a circular recess 36 which has been machined into the mounting plate 11. The engagement of the raised areas and the machined recess forms the lower guide for the rotatable picture stage 7. If the picture stage 7 is rotated in a plane normal to the optical axis a, for example, by activating a lever 7c which is connected with the lower part 7c of the picture stage, this rotary motion is transmitted to the light control channel 17 by the engagement of protrusion 33 of the picture stage 7 with the light control channel 17. FIG. 4 depicts the picture stage 7 and the light control channel 17 in a particular rotary position and FIG. 5 shows the same elements in another position rotated by 45° with respect to FIG. 4.

The light control channel 17 is preceded by the light mixing channel 16 which has a cross-section on the light exit end, the diagonal of which is shorter than the longest side length of the cross-section of the light entrance end of the light control channel 17. By this arrangement, a uniform illuminating immediately above the picture stage 7 is achieved for each rotary position of the picture stage 7 and with it of the light control channel 17. The light is mixed in a satisfactory way for all practical requirements, when one or more of the color filters 21, 22 and 23 are partially inserted in the light beam, and for every filter position and every rotary position of the picture stage 7. The dimensioning of the individual light control channels is determined by the format of the negative to be illuminated and the type of light source in use. It is therefore possible to provide a simple light control channel which is rotatable together with the picture stage. Depending upon the dimensions of the light control paths, the inner walls of the light control channel can be fashioned with diffusing or mirror reflective surfaces. For a better light distribution in the light exit surface of the illuminating system, the diffusing disc 20 can be arranged in a well known way with a diffusing action which is designed to vary across its cross-section. The light control channel need not necessarily be of rectangular construction, but its walls may be shaped in well known ways with different bends or curvatures.

Figure 3:
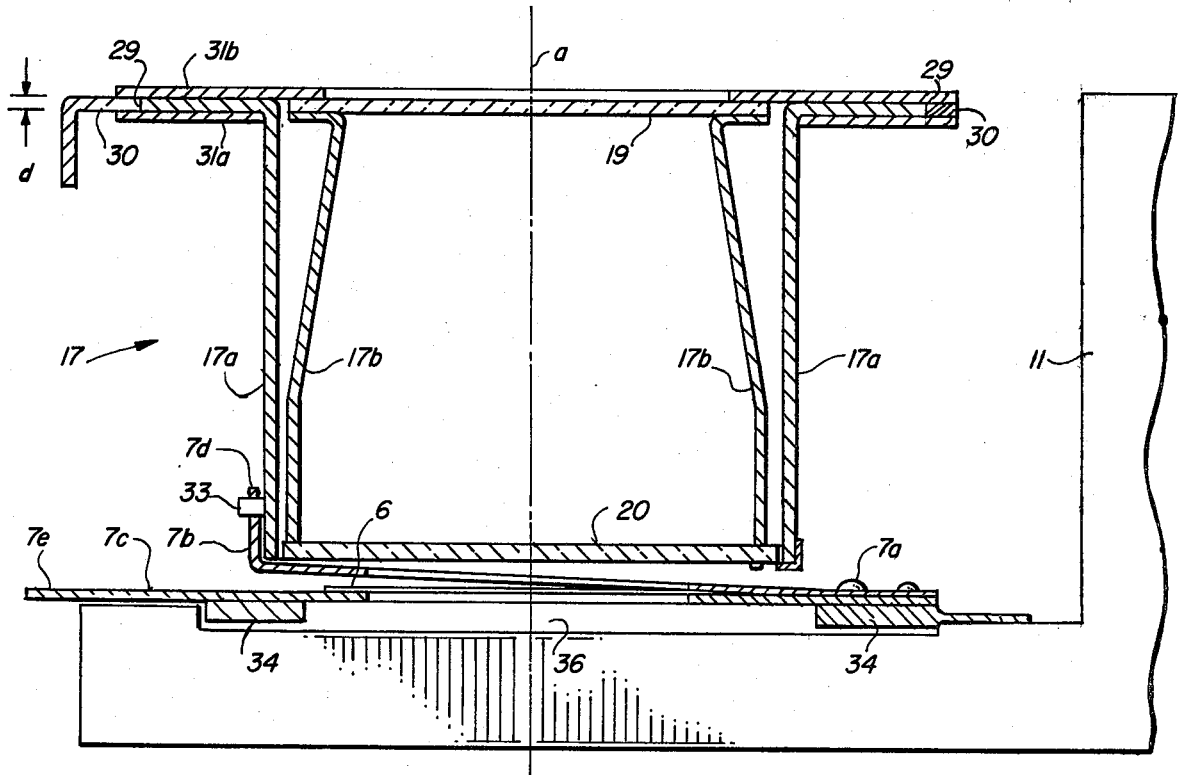
FIG. 3 is a detailed drawing of a portion of FIG. 2 with picture stage opened to receive a negative.

To allow a removal of the negative from the apparatus described, the illuminating stage 5 may be displaced with respect to the mounting plate 11 and the picture stage opened by using a lever 35 which is connected to the mounting plate 11 and engages the housing 28. When the illuminating system 5 is lifted, the light control channel 17 is also lifted, and the picture stage 7 is opened by the engagement of protrusion 33 with hole 7d as shown in FIG. 3. This opening is accomplished by pivoting the upper half 7b of the picture stage 7 around the hinge 7a while the lower half 7c of the picture stage remains in its original position due to the force of gravity. Therefore by lifting the illuminating system using lever 35, a simple exchange of the picture negative is possible independent of the rotary position. The picture stage may now be removed if desired by lifting it free of the recess 36 and sliding it outwardly to disengage it from the protrusion 33. To close the picture stage 7, the illuminating system 5 is dropped again into the original position by proper activation of lever 35. For the optimum illumination of different picture formats, the light control channel 17 may be exchanged for another light control channel of a different cross-section. For this purpose, the illuminating system is lifted using lever 35, the picture stage 7 is removed from its position and the plate 30, together with light control channel 17, is pulled out of guides 30a and is replaced with a different plate with a light control channel of a different cross-section.

The invention is not limited to one practical example, but applies to all illuminating systems for diffuse illumination which have at least one light control channel.

I claim:

1. In a photographic enlarging apparatus having a light source and a rotatable picture stage for receiving and supporting a negative to be projected, the improvement comprising: means comprising a light control channel positioned on the light entrance side of said picture stage and secured to said stage for rotation therewith about an axis normal to the plane of said negative.

2. The improvement set forth in claim 1 wherein said picture stage is removably secured to said light control channel.

3. The improvement set forth in claim 1 or 2 wherein said light control channel is detachably secured to said enlarging apparatus.

4. The improvement set forth in claim 3 wherein said apparatus includes a mounting plate having a circular depression therein, and wherein said picture stage includes raised portions extending into said depression to provide support for said picture stage and permit the rotation thereof.

5. The improvement set forth in claim 4 wherein said picture stage is formed of an upper portion detachably secured to said light control channel, and a lower portion removably supported by said mounting plate, and wherein said upper and lower portions are hingedly secured to each other.

6. In a photographic enlarging apparatus having a light source and a rotatable picture stage for receiving and supporting a negative to be projected, the improvement comprising: a first light control channel for receiving and directing light from said light source; a second light control channel mounted to receive light from said first light control channel, the diagonal of the cross-section of the light exit end of said first light control channel being shorter than the longest side length of the cross-section of the light entrance end of the second light control channel; the light exit end of said second light control channel being secured to said picture stage for rotation therewith about an axis normal to the plane of said negative.

7. The improvement set forth in claim 6 wherein said picture stage is removably secured to said second light control channel.

8. The improvement set forth in claims 6 or 7 wherein said second light control channel is detachably secured to said enlarging apparatus.

9. The improvement set forth in claim 6 or 7 wherein said apparatus includes a mounting plate having a circular depression therein and wherein said picture stage includes raised portions extending into said depression to provide support for said picture stage and permit the rotation thereof.

10. The improvement set forth in claim 9 wherein said picture stage is formed of an upper portion detachably secured to said second light control channel, and a lower portion removably supported by said mounting plate, and wherein said upper and lower portions are hingedly secured to each other.

11. In a photographic enlarging apparatus having a light source and a rotatable picture stage for receiving and supporting a negative to be projected, the improvement comprising a light control channel positioned on the light entrance side of said picture stage, the light exit end of said light control channel having a cross-section matching the area of said negative to be projected, said light control channel being secured to said picture stage for rotation therewith wherein the light exit end of said light control channel is maintained in alignment with said negative irregardless of the orientation of said picture stage.

12. The improvement set forth in claim 11 wherein said picture stage is removably secured to said light control channel.

13. The improvement set forth in claim 12 wherein said apparatus includes a mounting plate having a circular depression therein, and wherein said picture stage includes raised portions extending into said depression to provide support for said picture stage and permit the rotation thereof.

14. The improvement set forth in claim 13 wherein said picture stage is formed of an upper portion detachably secured to said light control channel, and a lower portion removably supported by said mounting plate, and wherein said upper and lower portions are hingedly secured to each other.

15. The improvement set forth in claim 11 wherein said light control channel is detachably secured to said enlarging apparatus.

* * * * *